US008675857B1

(12) United States Patent
Croak et al.

(10) Patent No.: US 8,675,857 B1
(45) Date of Patent: Mar. 18, 2014

(54) METHOD AND APPARATUS FOR ENABLING CUSTOMIZED AND SELECTABLE NETWORK ANNOUNCEMENTS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1735 days.

(21) Appl. No.: 11/019,487

(22) Filed: Dec. 22, 2004

(51) Int. Cl.
*H04M 3/42* (2006.01)
*H04L 12/66* (2006.01)
*H04M 3/00* (2006.01)

(52) U.S. Cl.
USPC ............... 379/221.11; 370/352; 379/266.01

(58) Field of Classification Search
USPC ............. 379/221.11, 266.01–266.09, 309; 370/412–417, 429
See application file for complete search history.

(56) References Cited

U.S. PATENT DOCUMENTS

| 6,122,364 | A | * | 9/2000 | Petrunka et al. | 379/265.02 |
|---|---|---|---|---|---|
| 6,178,240 | B1 | * | 1/2001 | Walker et al. | 379/266.01 |
| 6,301,354 | B1 | * | 10/2001 | Walker et al. | 379/266.01 |
| 6,400,804 | B1 | * | 6/2002 | Bilder | 379/76 |
| 6,614,781 | B1 | * | 9/2003 | Elliott et al. | 370/352 |
| 7,173,911 | B1 | * | 2/2007 | Sarkar et al. | 370/252 |
| 7,209,475 | B1 | * | 4/2007 | Shaffer et al. | 370/355 |
| 7,212,625 | B1 | * | 5/2007 | McKenna et al. | 379/266.01 |
| 7,889,858 | B2 | * | 2/2011 | Hamilton et al. | 379/266.01 |
| 8,249,240 | B2 | * | 8/2012 | Roberts et al. | 379/215.01 |
| 2002/0090076 | A1 | * | 7/2002 | Uppaluru et al. | 379/265.04 |
| 2002/0106071 | A1 | * | 8/2002 | Uppaluru et al. | 379/265.02 |
| 2002/0150232 | A1 | * | 10/2002 | Walker et al. | 379/266.01 |
| 2003/0103619 | A1 | * | 6/2003 | Brown et al. | 379/266.01 |
| 2003/0108184 | A1 | * | 6/2003 | Brown et al. | 379/265.09 |
| 2003/0223569 | A1 | * | 12/2003 | Flockhart et al. | 379/220.01 |
| 2004/0174980 | A1 | * | 9/2004 | Knott et al. | 379/266.01 |
| 2004/0234066 | A1 | * | 11/2004 | Beckstrom et al. | 379/266.07 |
| 2005/0074100 | A1 | * | 4/2005 | Lederman | 379/102.01 |
| 2007/0258577 | A1 | * | 11/2007 | Hamilton et al. | 379/266.01 |

* cited by examiner

*Primary Examiner* — Simon Sing
*Assistant Examiner* — Solomon Bezuayehu

(57) ABSTRACT

The present invention enables network providers of toll free calls to give customers a choice of what network announcements they want to listen to as they wait in queue. For example, customers could select to hear silence with periodic estimations of wait time, different types of music, current global, domestic, or local news, information about sports or financial information. The present invention allows customers to toggle between different selections via a predefined Dual Tone Multiple Frequency (DTMF) signal.

11 Claims, 4 Drawing Sheets

METHOD AND APPARATUS FOR ENABLING CUSTOMIZED AND SELECTABLE NETWORK ANNOUNCEMENTS

The present invention relates generally to communication networks and, more particularly, to a method and apparatus for enabling customized and selectable network announcements in packet switched networks, e.g., Voice over Internet Protocol (VoIP) networks.

BACKGROUND OF THE INVENTION

Customers who call a toll free number while all available customer agents are busy answering other calls will be put in a queue to wait for the next available customer agent. A toll free number is a telephone number used by a calling party to call a called party and the called party pays for the cost of the phone call. While they are waiting in queue, the network plays pre-recorded announcements repeatedly to the calling customers. These customers can become impatient due to the monotonous contents of these announcements. When they abandon the call, they are adding higher costs to retail expenses in the form of uncompleted calls and potential customer dissatisfaction.

Therefore, a need exists for a method and apparatus for enabling customized and selectable network announcements in packet-switched networks, e.g., VoIP networks.

SUMMARY OF THE INVENTION

In one embodiment, the present invention enables network providers of toll free calls to give customers a choice of what network announcements they want to listen to as they wait in queue. For example, customers could select to hear silence with periodic estimations of wait time, different types of music, current global, domestic, or local news, or information about sports. The present invention allows customers to select desired network announcement selection and toggle between different selections via predefined Dual Tone Multiple Frequency (DTMF) signals.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
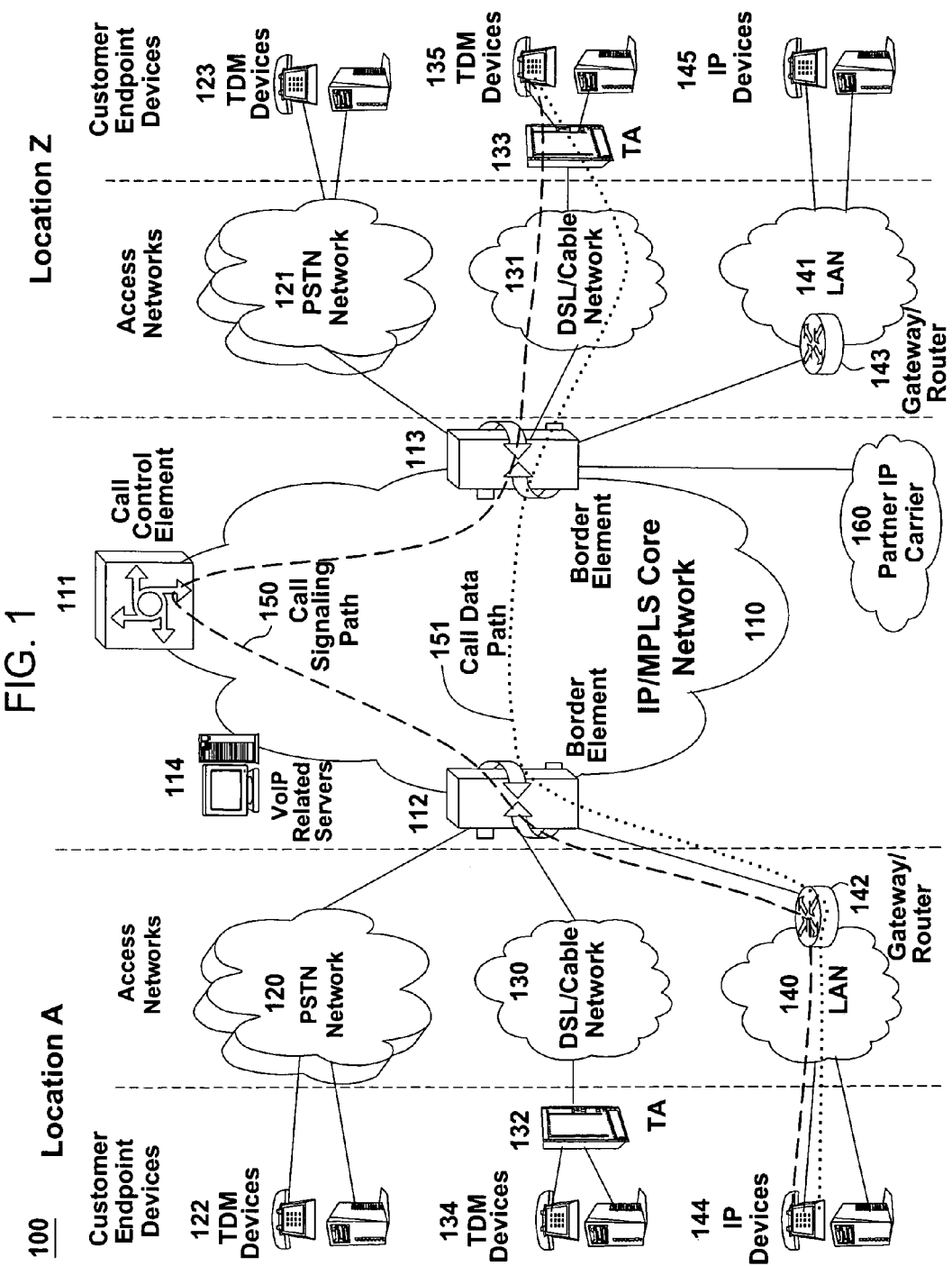
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Customers, who call a toll free number while all available customer agents are busy answering other calls, will be put in a queue to wait for the next available customer agent. A toll free number is a telephone number used by a calling party to call a called party and the called party pays for the cost of the phone call. While they are waiting in queue, the network plays pre-recorded announcements repeatedly to the calling customers. These customers can become impatient due to the monotonous contents of these announcements. When they abandon the call, they are adding higher costs to retail expenses in the form of uncompleted calls and potential customer dissatisfaction.

To address this criticality, the present invention enables network providers of toll free calls to give customers a choice of what network announcements they want to listen to as they wait in queue. For example, customers could select to hear silence with periodic estimations of wait time, different types of music, current global, domestic, or local news, information about sports, or financial information. The present invention allows customers to select desired network announcement selection and toggle between different selections via predefined Dual Tone Multiple Frequency (DTMF) signals.

Figure 2:
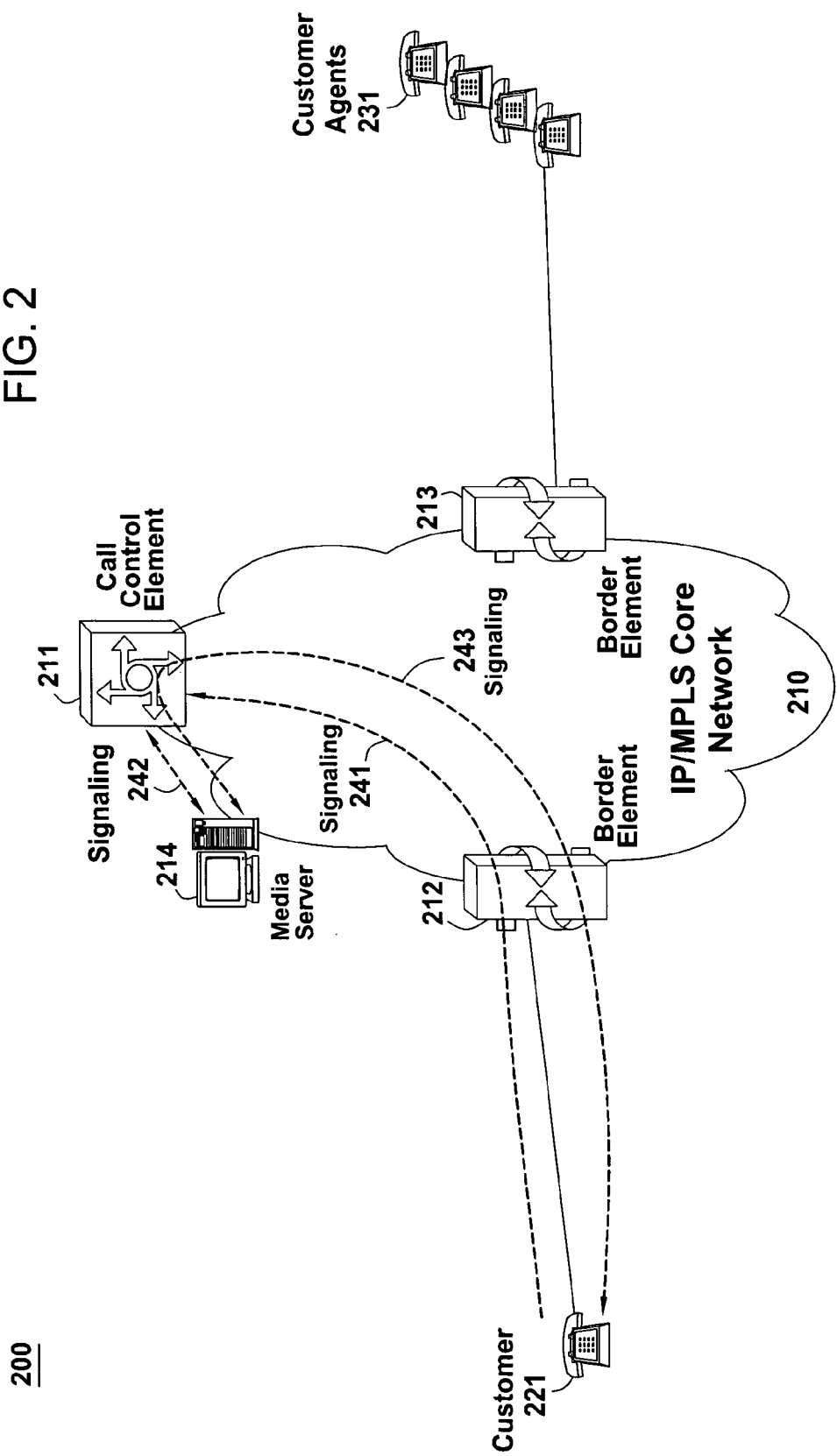
FIG. 2 illustrates an example of enabling customized and selectable network announcements in a VoIP network of the present invention.

FIG. 2 illustrates an example of enabling customized and selectable network announcements in a packet-switched network, e.g., a VoIP network. In FIG. 2, customer 221 makes a toll free number call, using flow 241, to a toll free service subscriber with a staff of customer agents, 231, answering incoming calls. When CCE 211 receives the call, all available customer agents are busy answering calls from other customers. Therefore, CCE 211 places the call in a queue waiting for the next free customer agent to be available. While the call is on hold, CCE 211 signals Media Server (MS) 214, using flow 242, to offer the customer in queue the customized and selectable network announcements service feature. A Media Server (MS) is a special server that typically handles and terminates media streams, and to provide services such as announcements, bridges, transcoding, and Interactive Voice Response (IVR) messages. CCE 211 relays a network announcement from MS 214 to customer 221, using flow 243, offering the customer a list of available network announcement contents that can be selected and listened to by the customer. The contents may include, but are not limited to, silence with periodic estimations of wait time, different types of music, current global, domestic, or local news, or information about sports. The types of available contents can be customized by the toll free service subscriber using an open standard interface, such as a website interface or an Interactive Voice Response (IVR) system interface. The customer can select the desired contents to listen to using a predefined DTMF signal. In addition, while listening to the selected contents waiting in queue, the customer can toggle between the selections of available network announcement contents by using another predefined DTMF signal. When the next customer agent is available, CCE 211 will complete the call setup procedures to connect the calling party and the called party.

Figure 3:
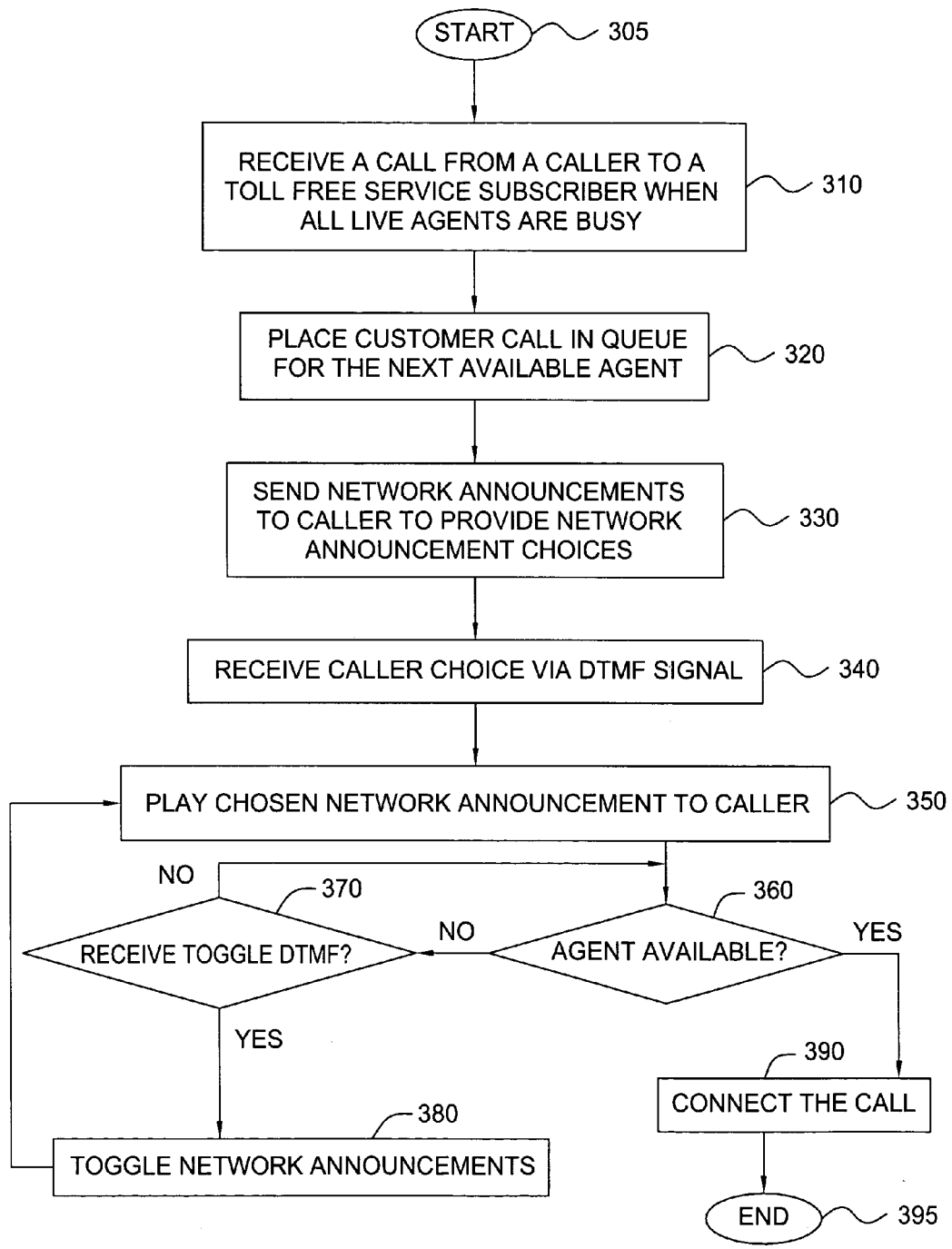
FIG. 3 illustrates a flowchart of a method for enabling customized and selectable network announcements in a VoIP network of the present invention.

FIG. 3 illustrates a flowchart of a method for enabling customized and selectable network announcements by the CCE in a VoIP network. Method 300 starts in step 305 and proceeds to step 310.

In step 310, the method receives a toll free number call to a toll free service subscriber when all of the subscriber's customer agents are busy answering other calls. In step 320, the method places the received call in queue to wait for the next customer agent to be available. In step 330, the method signals the Media Server to relay a selection of customized and selectable network announcement contents to the calling customer. In step 340, the method receives and relays to the Media Server a predefined DTMF signal from the customer corresponding to the desired choice of network announcement contents that the customer would like to listen to. In step 350, the method relays the chosen network announcement contents to the customer. In step 360, the method checks if a free customer agent is available. If a free customer agent is available, the method proceeds to step 390; otherwise, the method proceeds to step 370. In step 370, the method checks if a DTMF signal to toggle between the available selections of network announcement contents is received. If a DTMF signal to toggle between the available selections of network announcement contents is received, the method proceeds to step 380; otherwise, the method proceeds back to step 360. In step 380, the method toggles the current selection of network announcement contents to the next selection of network announcement contents and the method proceeds back to step 350. In step 390, the method connects the call between the calling party and the called party. The method ends in step 395.

Figure 4:
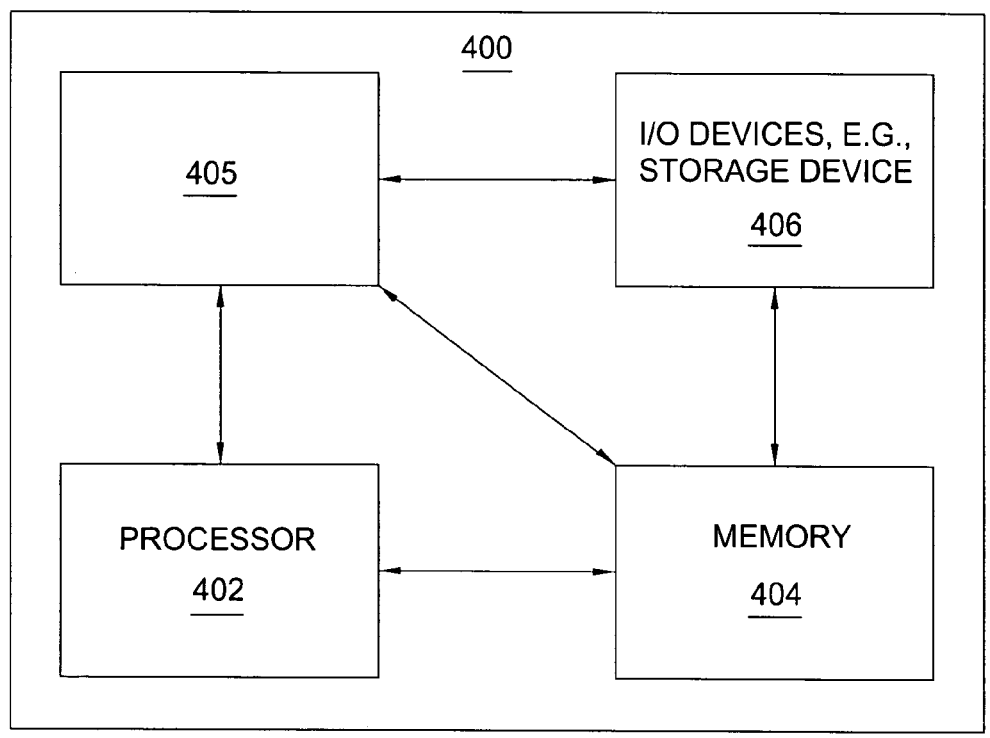
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a customized and selectable network announcements module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present customized and selectable network announcements module or process 405 can be loaded into memory 404 and executed by processor 402 to implement the functions as discussed above. As such, the present customized and selectable network announcements process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a plurality of network announcement contents in a communication network, comprising:
   receiving, by a processor of a call control element in the communication network comprising a voice over internet protocol network, an incoming call from a calling party to a toll free service subscriber;
   placing, by the processor, the calling party in a queue when the toll free service subscriber is unable to provide an agent to receive the incoming call;
   signaling, by the processor, to a media server to always present an option to the calling party to allow the calling party to select the plurality of network announcement contents via the media server in the communication network in response to the placing the calling party in the queue, wherein the plurality of network announcements is customized by the calling party using a website interface;
   playing, by the processor, the plurality of network announcement contents selected by the calling party; and
   toggling, by the processor, between the plurality of network announcement contents while one of the plurality of network announcement contents that was selected is being presented to the calling party, when a predefined dual tone multiple frequency signal is received from the calling party, wherein a different predefined dual tone multiple frequency signal is assigned to each of the plurality of network announcements, wherein the plurality of network announcement contents comprises different types of information.

2. The method of claim 1, wherein the selected network announcement content is played by the media server.

3. A non-transitory computer-readable medium storing a plurality of instructions which, when executed by a processor of a call control element, cause the processor to perform operations for providing a plurality of network announcement contents in a communication network comprising a voice over internet protocol network, the operations comprising:
   receiving an incoming call from a calling party to a toll free service subscriber;
   placing the calling party in a queue when the toll free service subscriber is unable to provide an agent to receive the incoming call;
   signaling to a media server to always present an option to the calling party to allow the calling party to select the plurality of network announcement contents via the media server in the communication network in response to the placing the calling party in the queue, wherein the plurality of network announcements is customized by the calling party using a website interface;
   playing the plurality of network announcement contents selected by the calling party; and
   toggling between the plurality of network announcement contents while one of the plurality of network announcement contents that was selected is being presented to the calling party, when a predefined dual tone multiple frequency signal is received from the calling party, wherein a different predefined dual tone multiple frequency signal is assigned to each of the plurality of network announcements, wherein the plurality of network announcement contents comprises different types of information.

4. The non-transitory computer-readable medium of claim 3, wherein said selected network announcement content is played by the media server.

5. An system for providing a plurality of network announcement contents in a communication network, comprising:
   a processor of a call control element in the communication network comprising a voice over Internet protocol network; and
   a computer-readable medium storing a plurality of instructions which, when executed by the processor, cause the processor to perform operations, the operations comprising:
      receiving an incoming call from a calling party to a toll free service subscriber;
      placing the calling party in a queue when the toll free service subscriber is unable to provide an agent to receive the incoming call;
      signaling to a media server to always present an option to the calling party to allow the calling party to select the plurality of network announcement contents via the media server in the communication network in response to the placing the calling party in the queue, wherein the plurality of network announcements is customized by the calling party using a website interface;
      playing the plurality of network announcement contents selected by the calling party; and
      toggling between the plurality of network announcement contents while one of the plurality of network announcement contents that was selected is being presented to the calling party, when a predefined dual tone multiple frequency signal is received from the calling party, wherein a different predefined dual tone multiple frequency signal is assigned to each of the plurality of network announcements, wherein the plurality of network announcement contents comprises different types of information.

6. The method of claim 1, wherein one of the plurality of network announcements comprises sports information.

7. The method of claim 1, wherein one of the plurality of network announcements comprises news.

8. The non-transitory computer-readable medium of claim 3, wherein one of the plurality of network announcements comprises sports information.

9. The non-transitory computer-readable medium of claim 3, wherein one of the plurality of network announcements comprises news.

10. The system of claim 5, wherein one of the plurality of network announcements comprises sports information.

11. The system of claim 5, wherein one of the plurality of network announcements comprises news.

* * * * *